(12) United States Patent
Newcombe

(10) Patent No.: US 12,385,671 B1
(45) Date of Patent: Aug. 12, 2025

(54) MODULAR SOLAR CONCENTRATOR SYSTEMS

(71) Applicant: Christopher Newcombe, Beaverton, OR (US)

(72) Inventor: Christopher Newcombe, Beaverton, OR (US)

(*) Notice: Subject to any disclaimer, the term of this patent is extended or adjusted under 35 U.S.C. 154(b) by 0 days.

(21) Appl. No.: 18/755,572

(22) Filed: Jun. 26, 2024

(51) Int. Cl.
| | |
|---|---|
| *F24S 30/425* | (2018.01) |
| *F24S 10/40* | (2018.01) |
| *F24S 20/00* | (2018.01) |
| *F24S 23/70* | (2018.01) |
| *F24S 23/77* | (2018.01) |
| *F24S 30/00* | (2018.01) |
| *F24S 50/20* | (2018.01) |
| *F24S 80/30* | (2018.01) |
| *H02S 40/22* | (2014.01) |

(52) U.S. Cl.
CPC ............ *F24S 30/425* (2018.05); *F24S 10/45* (2018.05); *F24S 23/77* (2018.05); *F24S 50/20* (2018.05); *H02S 40/22* (2014.12); *F24S 2020/10* (2018.05); *F24S 2023/876* (2018.05); *F24S 2030/136* (2018.05); *F24S 80/30* (2018.05)

(58) Field of Classification Search
CPC .......... F24S 30/425; F24S 50/20; F24S 23/77; F24S 10/45; H02S 40/22
USPC ....... 126/570, 600, 606, 607, 684–685, 687, 126/652, 707–708, 702
See application file for complete search history.

(56) References Cited

U.S. PATENT DOCUMENTS

| | | | | |
|---|---|---|---|---|
| 3,861,379 | A * | 1/1975 | Anderson, Jr. ......... | F24S 23/77 353/3 |
| 4,159,710 | A | 7/1979 | Prast | |
| 4,273,104 | A * | 6/1981 | Uroshevich ............. | F24S 40/80 126/690 |
| 5,024,211 | A * | 6/1991 | Winzen ................... | F24S 80/30 126/600 |
| 8,281,782 | B2 * | 10/2012 | Simon ................... | H10F 77/488 126/621 |
| 2009/0000613 | A1 * | 1/2009 | Edwards ............. | H01L 31/0547 126/684 |
| 2010/0051016 | A1 * | 3/2010 | Ammar ................... | F24S 23/80 126/600 |
| 2010/0319684 | A1 * | 12/2010 | Almogy ............. | H01L 31/0547 126/714 |

OTHER PUBLICATIONS

"Solar Water Heaters," US Department of Energy Website, Available Online at https://www.energy.gov/energysaver/solar-water-heaters, Available as Early as Sep. 29, 2015, 10 pages.

* cited by examiner

*Primary Examiner* — Vivek K Shirsat
(74) *Attorney, Agent, or Firm* — McCoy Russell LLP

(57) ABSTRACT

Systems and methods are provided for modular solar concentrator systems including one or more interconnected solar concentrator units. In one example, the solar concentrator units include a weather-resistant container with a transparent top, a receiver, and a plurality of reflectors positioned within the weather-resistant container and adapted to reflect light onto the receiver.

18 Claims, 9 Drawing Sheets

MODULAR SOLAR CONCENTRATOR SYSTEMS

TECHNICAL FIELD

The present description relates generally to renewable energy, and more particularly concentrating solar collectors.

BACKGROUND AND SUMMARY

Solar concentrators may capture and focus sun rays to generate high temperatures in a receiver. Prior solar concentrators have largely concerned large-scale systems, often utility-scale in scope, demanding a large expanse of open ground to be deployed on. Large-scale solar concentrators may be unsuitable for deployment on rooftops, small parcels of land, or other areas with relatively limited space.

Non-concentrating solar collectors (e.g., absorbent heaters such as plate heaters and vacuum tube heaters) may be more conducive to small spaces. Plate heaters may have a dark surface, often a metal plate, that absorbs heat from sunlight and transfers it to air or fluid circulating in or over the dark surface. Vacuum tube heaters may include a pipe with a thermally absorbent surface enclosed in a transparent, evacuated tube to thermally insulate from losing heat to surrounding air. However, non-concentrating solar absorbers cannot achieve as high a temperature when heating a medium, such as water, as a concentrating solar collector, thus limiting energy capture.

Previous attempts at creating a solar concentrator suitable for small-scale applications (e.g., residential rooftop mounting) may not address at least some issues related to maintenance and functionality (e.g., efficiency of energy capture). For example, prior solar concentrator designs may have open framework construction (e.g., open top structure) with exposed moving parts, allowing dust and debris accumulation, and physical impacts directly to reflecting surfaces and moving parts. Thus, more complicated cleaning and more frequent maintenance may be demanded. Moreover, such open designs may increase likelihood of degradation and shorten a service lifetime of the reflective surfaces. Similarly, abrasion from cleaning the reflective surfaces may increase the likelihood of degradation and shorten the service lifetime of the reflective surfaces. Cleaning of an open top system is also burdensome for a user, with many small parts and surfaces where dust and debris may settle.

Further, previous solar concentrators may address tracking the sun's motion on only a single axis (e.g., the sun's motion in a single day). However, further utilization of the sun's rays as the solar zenith angle changes throughout the year demands a second axis of motion, adding complexity and cost to installation of previous designs. In other words, prior art concentrators may be able to track daily movement of the sun but may not compensate for seasonal changes in the sun's path. Thus to avoid a decrease in energy capture, user intervention or other external methods may be demanded to adjust angles of the installation throughout the year. Further still, existing designs may not be easily customizable to varying geometry of each installation, thereby increasing resource demand to accommodate different applications, or decreasing space efficiency (e.g., in terms of area used compared to available area).

Thus, embodiments are disclosed herein that address at least some of the issues described above with a solar concentrator system comprising one or more interconnected solar concentrator units, wherein the solar concentrator units comprise a weather-resistant container with a transparent top, a receiver, and a plurality of reflectors positioned within the weather-resistant container and adapted to reflect light onto the receiver. In this way, maintenance demands may be reduced by inclusion of the container for protection of the reflectors and moving parts (e.g., gears) from dirt, debris, water, and ice fouling mechanisms. The container may be faster for a user to clean than many individual parts, such as moving parts and reflectors. The container may be of a compact, enclosed form and thus less affected by wind than bulkier or open concentrators such as parabolic troughs or dish concentrators. The container also presents less visual profile (e.g., smaller footprint) than such designs which may increase acceptance among small-scale operators such as homeowners.

Further, the solar concentrator system may be installed in small areas such as rooftops, small parcels of land, or other areas with relatively limited space, such that motion of the sun may be tracked in two non-parallel directions without moving or otherwise manually adjusting the solar concentrator units after installation. For example, sunlight angle changes due to movement of the sun in the sky may be accounted for in both a north-south direction and an east-west direction such that seasonal and daily changes, respectively, in angles of sunlight may be reflected onto the receiver. Additionally, resource demand may be reduced due to modularity of the solar concentrator units making customization of the solar concentrator system to geometry of the installation areas more simple. Furthermore, space efficiency may be increased due to individual units may being interconnected to form a single energy system during installation according to the available space, sharing receiver lines and drive lines. Additionally, due to the smaller size of each unit, fewer installers (e.g., one or two people) may be demanded for installation, further reducing resource demand. Further still, the size and geometry of the containers may be compatible with mounting hardware already developed for mounting solar panels (e.g., photovoltaic panels) on roofs and other surfaces present. Finally, the modularity and interconnectivity of the solar concentrator units may allow for scaling to cover a range of areas, including varying installation surface shapes (e.g., rectangular, triangular, circular, etc.) and sizes (e.g., small and large scale applications).

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
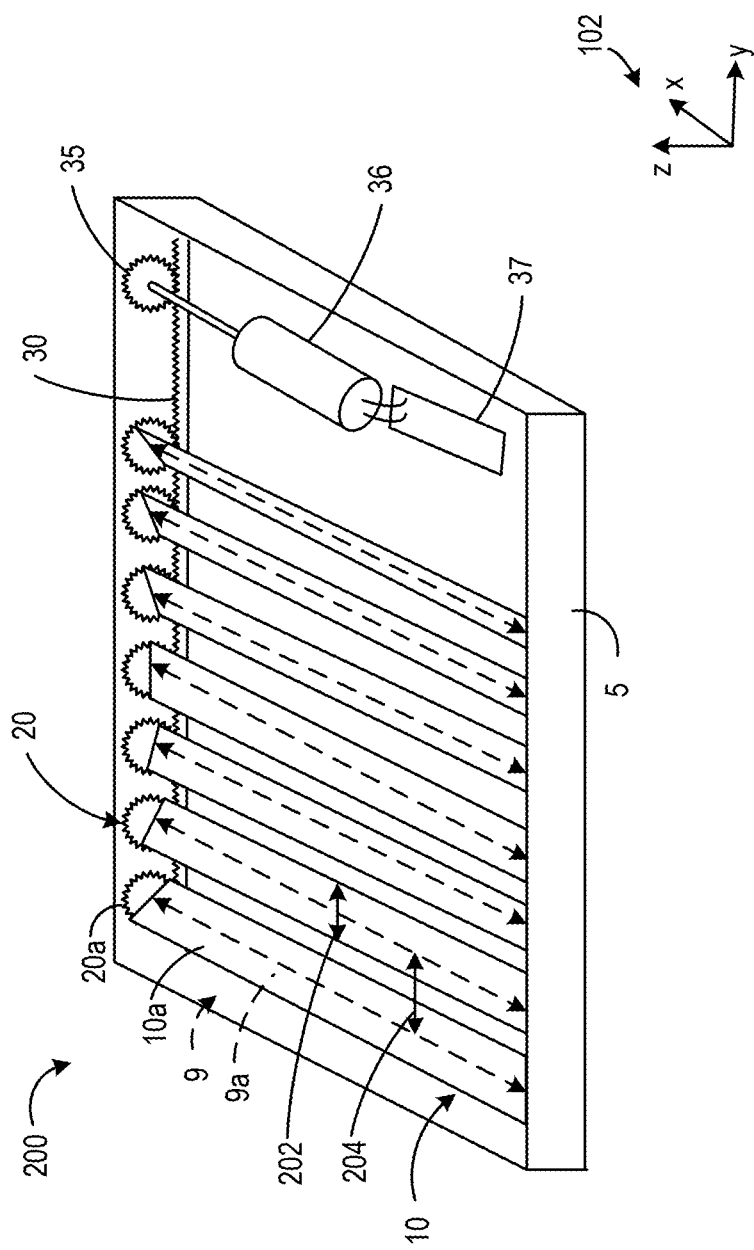
FIG. 2 shows an isometric view of an interior of the container.
Figure 3:
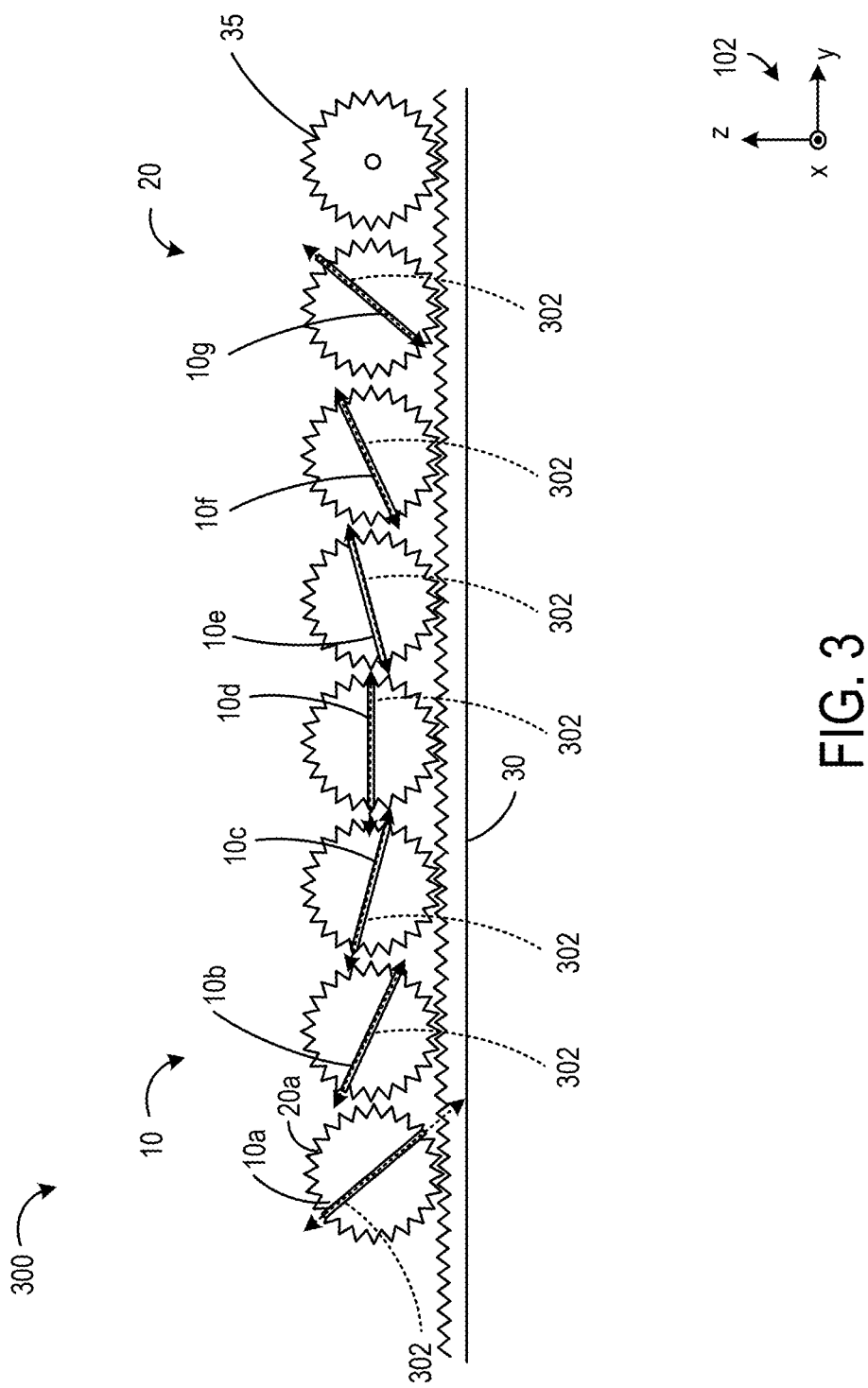
FIG. 3 shows a side view of a rack and gears of the solar concentrator.
Figure 5:
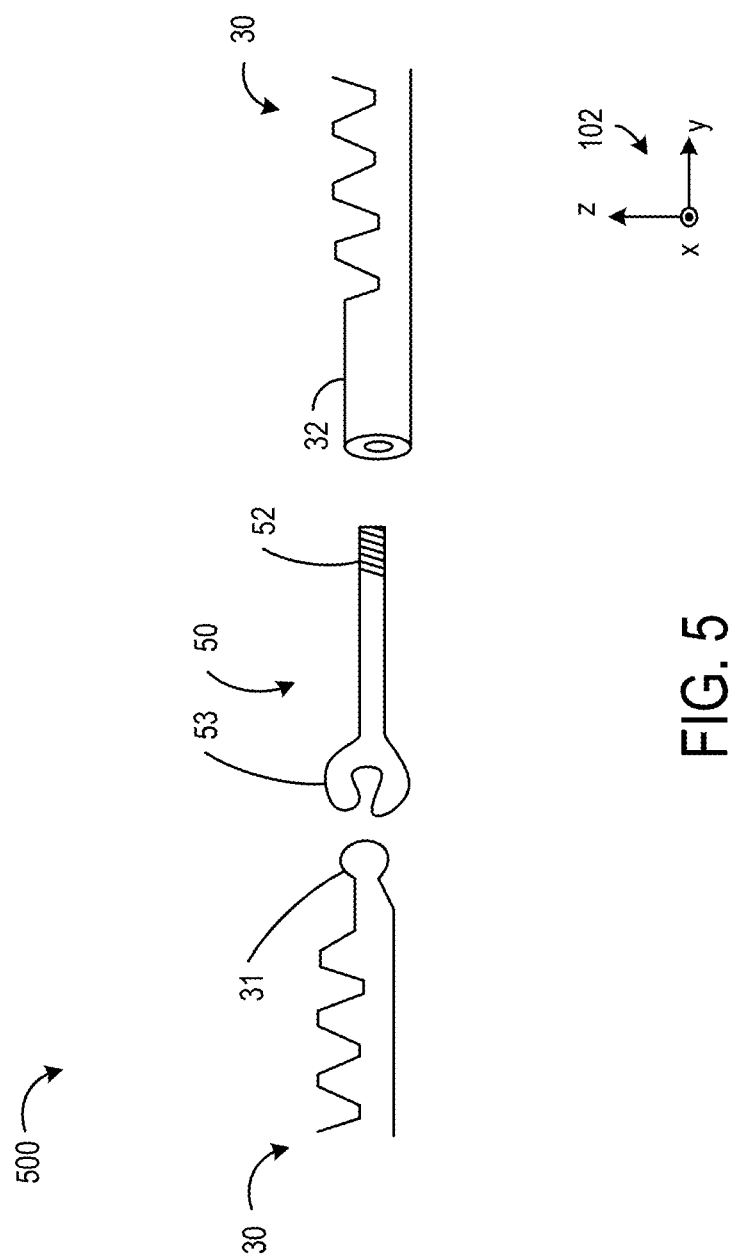
FIG. 5 shows a detailed view of an example of a modular coupler used to connect the racks of adjacent solar concentrator units.
Figure 6:
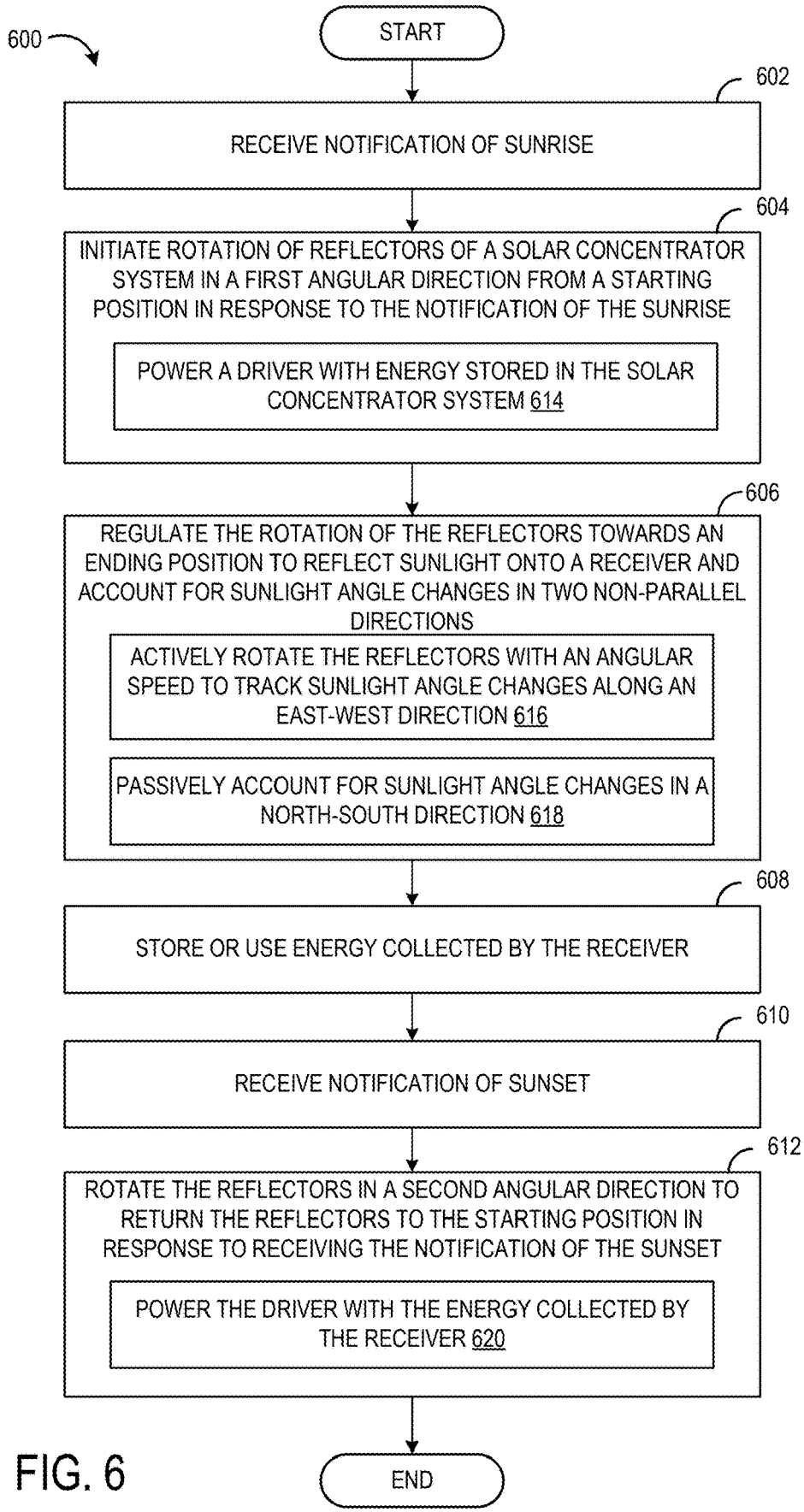
FIG. 6 shows a flowchart of a method for operating the solar concentrator of the present disclosure.
Figure 7A:
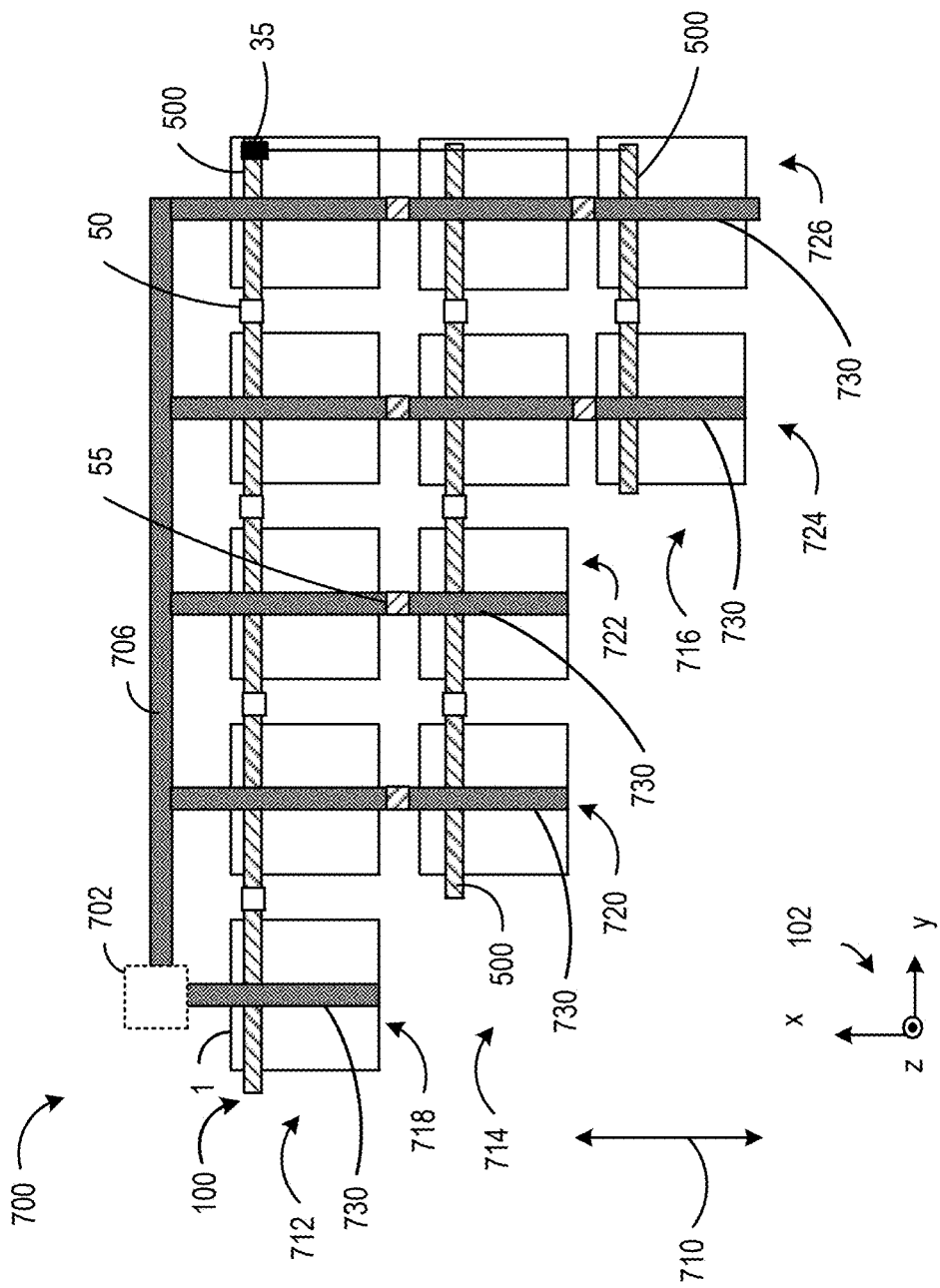
FIGS. 7A-7B show examples of solar concentrator systems comprising two or more interconnected solar concentrator units.
Figure 7B:
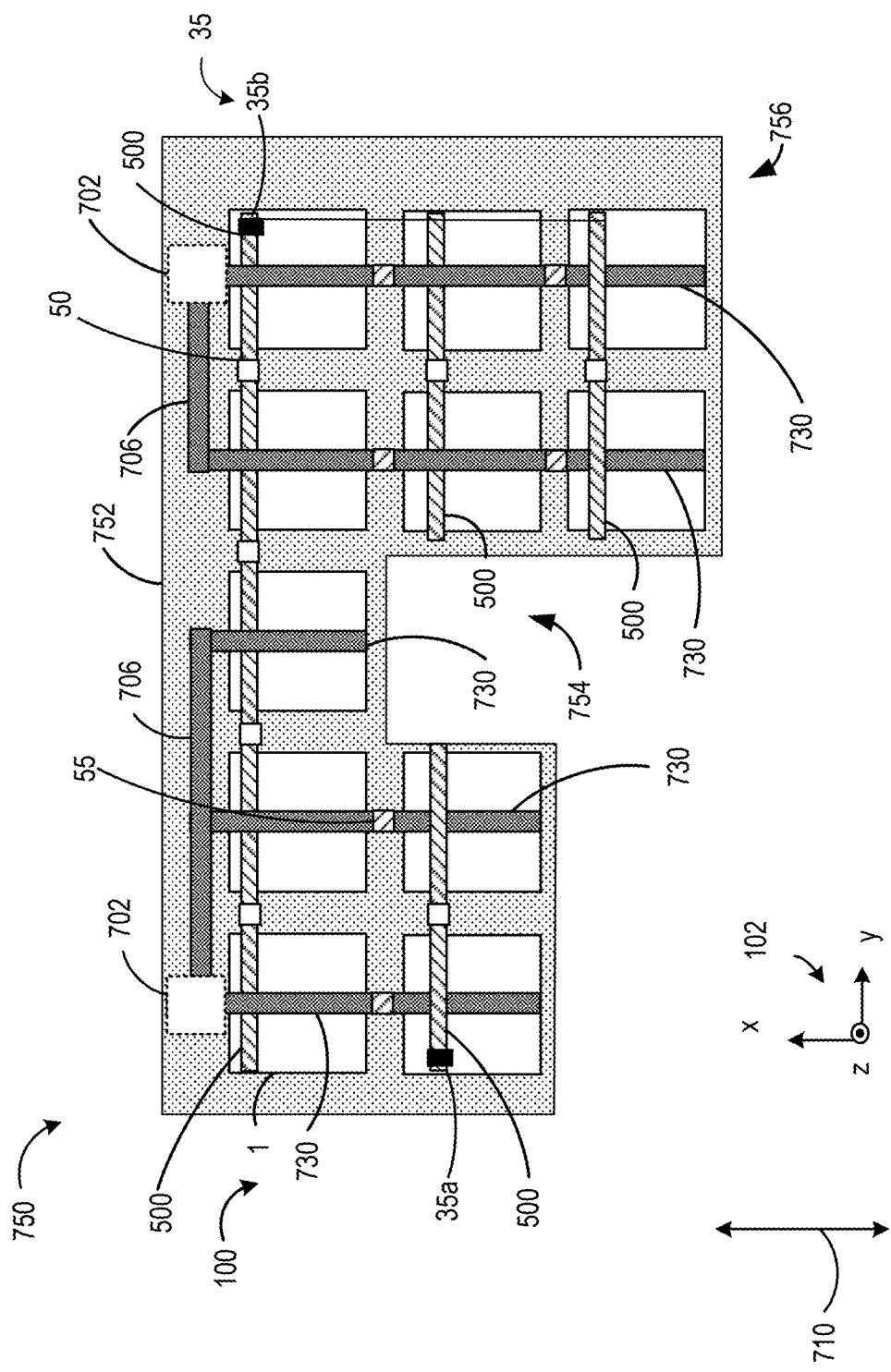
Figure 8:
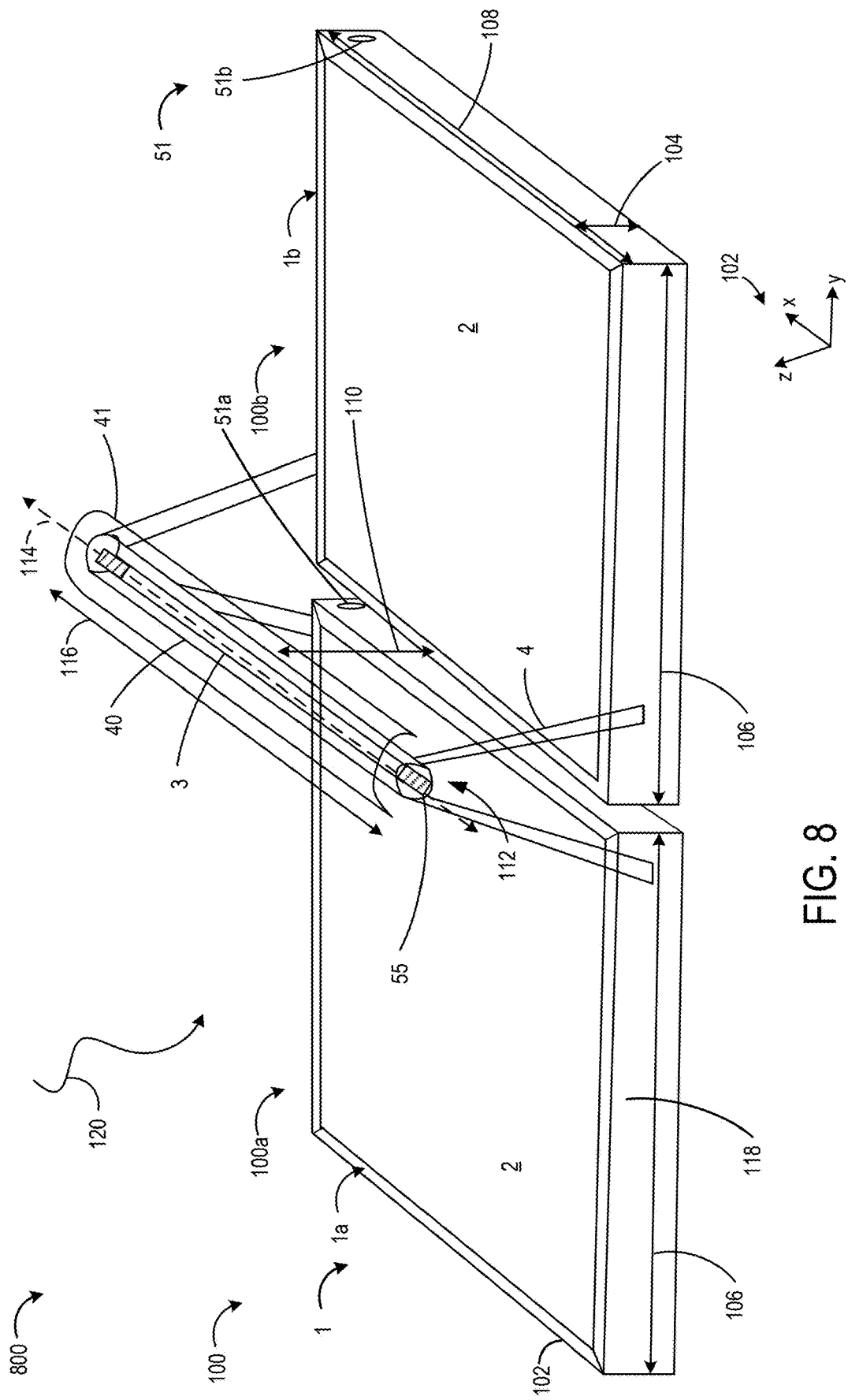
FIG. 8 shows an example of solar concentrator units sharing a single receiver.

The following description relates to systems and methods for solar concentrator systems comprising one or more solar concentrator units. An example of a solar concentrator unit in accordance with one or more embodiments of the present disclosure is provided in FIG. 1. The solar concentrator unit shown in FIG. 1 may comprise a weather-resistant container enclosing a plurality of components, and receiver above the container. An interior view of the container and the plurality of components, including reflectors, a rack, and gears adapted to rotate the reflectors, enclosed by the container is shown in FIG. 2. An embodiment of the reflectors is further shown in FIGS. 4A and 4B and the rack and gears are shown in FIG. 3. Two or more solar concentrator units may be interconnected, for example by joining the racks of adjacent solar concentrator units into a drive line as shown in FIG. 5. The receivers may also be joined to connect adjacent solar concentrator units into a receiver line (e.g., fluid line). FIGS. 7A-7B show schematic examples of solar concentrator systems with two or more solar concentrator units interconnected into a single solar energy capturing system. The solar concentrator units may be connected in a variety of geometries, allowing for customization in a modular fashion according to an implementation (e.g., installation location) of the solar concentrator system. Further, two or more solar concentrator units may be interconnected such that at least two of the units share a single receiver, such as shown in FIG. 8, to further reduce resource demand and system complexity. FIG. 6 shows a flowchart of a method for operating a solar concentrator system, wherein the solar concentrator system includes at least one solar concentrator unit, such as the solar concentrator unit of FIG. 1.

It is to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

Figure 1:
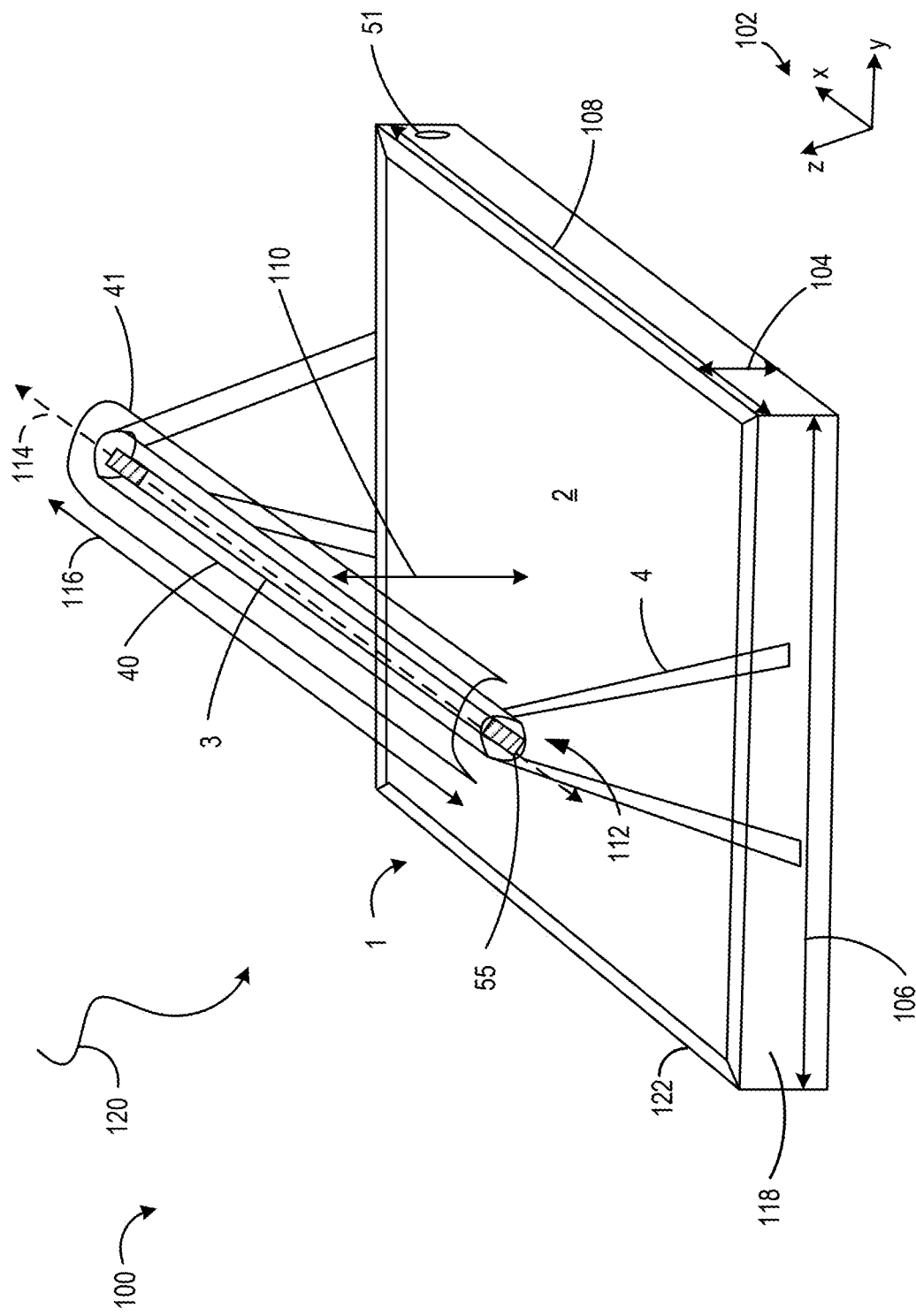
FIG. 1 shows an isometric view of a container and a receiver of a solar concentrator unit according to one or more embodiments of the present disclosure.

Turning to FIG. 1, a solar concentrator unit 100 in accordance with one or more embodiments of the present disclosure is shown. A set of reference axes 102 are also shown including an x-axis, a y-axis, and a z-axis, wherein the z-axis may be a vertical direction and the x-axis and y-axis may be lateral directions. In some examples, the z-axis may be approximately parallel with a direction of gravity. In other examples, the solar concentrator unit 100 may be tilted such that the z-direction is offset from (e.g., at a non-zero angle with) the direction of gravity. In at least some examples, the z-direction is oriented according to the sun at a desired time. For example, the solar concentrator unit 100 may be positioned such that the z-direction is parallel with sun rays 120 at midday on an equinox to increase solar energy captured, as described further below. The reference axes 102 are further shown in FIGS. 1-8.

The solar concentrator unit 100 may include a container 1, wherein the container 1 is constructed at least in part of a weather-resistant material in order to protect components enclosed within the container 1. In this way, the weather-resistant container 1 may be waterproof and prevent debris, dirt, and abrasive weather such as wind and rain from degrading components positioned within the container 1. The container 1 may be roughly rectangular prism shaped, in at least some examples. However, the container 1 may take other shapes depending on a demanded configuration of a solar concentrator system.

Dimensions of the container 1 may include a height 104 parallel with the z-axis, a width 106 parallel with the y-axis, and a length 108 parallel with the x-axis. The height 104 may be significantly smaller than the width 106 and the length 108. In this way, the container 1 may be designed with a reduced height profile, which may be desirable to camouflage the appearance in some implementations of the solar concentrator unit 100 (e.g., installed on a rooftop).

A top 2 of the container 1 may be constructed of a transparent material. In this way, light (e.g., sun rays 120) may reach components contained within the container 1. In some examples, sides 118 and bottom of the container 1 are made of a different material than the transparent material of the top 2. In such examples, the different material may be any degree of opaque or transparent without departing from the scope of the present disclosure. However, in other examples, the sides 118 and the bottom of the container are made of the same material as the top 2 such that the entire container is transparent and weather-resistant. The top 2 may be sealed to the sides 118 at interfaces 122 around a perimeter of the top 2, for example with a silicone seal to prevent fluid and debris (e.g., water, dust, dirt, etc.) from entering the container 1. To gather maximum sunlight throughout the year, the solar concentrator unit 100 may be placed such that the top 2 is perpendicular to the sun rays 120 at mid-day on an equinox.

A receiver 3 may be positioned vertically above the container 1. The receiver 3 may receive (e.g., absorb) light reflected by components within the container (e.g., reflectors 10 of FIG. 2). The receiver 3 may include a conductive pipe (e.g., metal pipe) carrying a liquid to be heated by the received light circumferentially surrounded by a transparent, evacuated tube 40 for thermal insulation of the pipe and liquid. In other examples, the receivers 3 may be photovoltaic cells. The receiver 3 may send concentrated sunlight through optical pipes, such as fiber optics, directly or via second reflectors.

Further, there may be a curved reflector 41 positioned above the receiver 3 and adapted to reflect light towards the receiver 3. The curved reflector 41 may be a curved surface partially circumferentially surrounding the receiver 3. The curved reflector 41 is shown transparently in FIG. 1 so as not to block a view of the receiver 3, however, the curved reflector 41 may not be transparent in practice. The surface of the curved reflector 41 facing towards the receiver 3 may be reflective. In this way, light not absorbed by the receiver 3 after being reflected toward the receiver 3 may be reflected by the curved reflector 41 back towards the receiver 3, increasing absorbed energy over time and thereby increasing efficiency of the solar concentrator unit 100.

The receiver 3 may extend along a central axis 114 parallel to the top 2 and be secured to the container 1 via supports 4. In at least some examples, a length 116 of the receiver 3 may be approximately the same as the length 108. The supports 4 may fix the receiver 3 at a distance 110 from the top 2. The supports 4 may maintain the distance 110. For example, as shown in FIG. 1, the supports 4 may include two posts fixed to each end of the receiver 3, the posts further secured to the container 1, forming a triangular shape at each end of the receiver 3. Additionally, or alternatively, there may be further framework securing the receiver 3 to the container 1. Further, the supports may take other shapes than the posts shown. It may be advantageous to not secure the supports 4 to the receiver 3 at points other than the ends, in order to ensure reflectors within the container 1 (e.g., reflectors 10 of FIG. 2) are not obstructed from light (e.g., sun rays) by the supports 4 positioned in such a way.

A receiver coupling 55 may extend from an end 112 of the receiver 3. For examples wherein the receiver 3 is a tube as shown in FIG. 1, the receiver coupling 55 may be a pipe thread coupling adapted to fit to an end of another solar concentrator unit positioned such that their receivers 3 align with a common central axis 114. The receiver coupling 55 may be shaped according to a type of receiver 3. Another connector (e.g., drive coupling 50 of FIG. 5) may be inserted through a coupling port 51 to connect racks which rotate reflectors (e.g., rack 30 of FIG. 2). There may be one or more ports such as the port 51 through which solar concentrator units such as the solar concentrator unit 100 may be coupled to one or more other solar concentrator units. Connection of solar concentrator units is further described below in regards to FIGS. 5, 7A and 7B.

In some examples, the receiver 3 may be enclosed within a transparent container (not shown), additionally or alternatively to the container 1. For example, the transparent container may enclose the container 1 and contents thereof, the receiver 3, and the supports 4. In such an example, the receiver 3 may be further protected from degradation and maintenance demands (e.g., cleaning frequency and difficulty) may be further reduced.

Turning to FIG. 2, an interior view 200 of the container 1 of FIG. 1 is shown, including an internal framework 5 supporting components contained within the container, including a plurality of reflectors 10. The reflectors 10 may be elongated along a plurality of first axes 9 shown in FIGS. 2, 4A, and 4B as dashed arrows parallel with the x-axis. The first axes 9 may be axes of rotation such that each of the reflectors 10 may be rotated about the respective first axes 9. For example, a first reflector 10a may rotate about a first first axis 9a.

In at least some examples, the first axes 9 may be coplanar (e.g., aligned in an x-y plane) with each other. Further, the first axes 9 may be parallel with an axis along which the receiver (e.g., receiver 3 of FIG. 1) is centered. Further still, the solar concentrator unit 100 may be oriented such that the first axes 9 are parallel with a north-south direction such that the receivers rotate to change angles in an east-west direction, according to daily sunlight angle changes. The reflectors 10 may be angled (e.g., with respect to the top 2 of FIG. 1) such that sunlight incident on the reflectors 10 is reflected onto the receiver 3 of FIG. 1. The reflectors 10 may be positioned at different angles from one another, as described further below with regards to FIG. 3.

The reflectors 10 may be fixed (e.g., rotationally coupled) to a plurality of gears 20 (e.g., pinion gears) in mesh with a rack 30. For example, the first reflector 10a may be rotationally coupled with a first gear 20a such that the first reflector 10a and the first gear 20a rotate with the same angular speed according to a linear speed of the rack 30. In this way, the reflectors 10 may be rotationally coupled with each other such that all of the reflectors 10 may be rotated about their respective first axes 9 at the same rate of rotation (e.g., angular speed). The reflectors 10 may be spaced in the y-direction such that each reflector may rotate without interference from other reflectors. For example, a distance 204 between adjacent first axes 9 may be larger than the width 202 of the reflectors 10. In at least some examples, the reflectors 10 may be equidistantly spaced along the y-direction. For example, the gears 20 may have approximately the same diameter and number of teeth and be positioned with a same number of rack teeth between each adjacent pair of gears 20. The gears 20 may not be in mesh with each other, in at least some examples.

For example, rotation of the reflectors 10 may be driven by a driver 36 rotationally coupled to a drive gear 35 in mesh with the rack 30. The driver 36 may be a motor. In some examples, one of the gears 20 may be directly rotationally coupled with the driver 36 such that the gear acts as the drive gear 35. In at least some examples, an output of the driver 36 may be run through a reduction gearbox to achieve a slow, precise movement of the rack 30. The driver 36 may be controlled by a controller 37 programmed with effective sunrise and sunset times for the location where the solar concentrator unit 100 is installed. Thus the driver 36 may maintain alignment of the plurality of reflectors 10 to reflect sunlight onto the receiver as movement of the sun progresses throughout a day. During the night, the driver 36 may rotate the reflectors 10 to a predetermined orientation for the next sunrise. For example, the controller may implement a method such as the method 600 of FIG. 6 in order to track sunlight angle changes due to movement of the sun.

The configuration shown in FIG. 2 is a non-limiting example of a mechanism for rotating the plurality of reflectors 10 with approximately the same angular speed. As such, other mechanisms of rotation may be implemented in a solar concentrator unit in accordance with the present disclosure. For example, the reflectors 10 may be rotated by other means than a rack such as the rack 30.

Turning to FIG. 3, the gears 20, the drive gear 35, and the rack 30 are shown in a first position 300. The first position 300 is one example of angles at which the reflectors may be in. As the gears 20 are rotated by the rack 30 driven by the drive gear 35, the reflector angles change accordingly. As described above, the reflectors 10 are rotated with a same rotational speed, thus a rate of change of the reflector angles is also approximately the same, and the reflector angles may remain the same relative to one another. The reflectors 10 are represented by lines in the view looking down the x-axis shown in FIG. 3, however, the reflectors 10 may not be flat looking down the x-axis in at least some examples, as described in regards to FIGS. 4A and 4B. Further, other mechanisms for rotationally coupling the reflectors 10 may be utilized alternatively to the rack 30.

The reflectors 10 may have second axes 302, each perpendicular to the first axes 9. The second axes 302 may each further be coplanar with the corresponding first axis 9 and a reflective surface of the reflector 10. The second axes 302 may not be parallel or collinear such that the reflectors 10 may be angled towards the receiver at non-zero angles relative to adjacent reflectors 10 (e.g., with respect to the y-axis or z-axis). For example, as shown in the position 300 in FIG. 3, the first reflector 10a may be at a greater angle with respect to the y-axis than a second reflector 10b, and the second reflector 10b may be at a greater angle with respect to the y-axis than a third reflector 10c. In this way, in the position shown, the reflectors 10 may be angled inwards towards the receiver 3 of the solar concentrator unit 100 shown in FIG. 1. Further, the angles of the reflectors 10 with respect to the y-axis may be symmetrical in this position. For example, the angle of the first reflector 10a reflected across the z-axis may be approximately the same as the angle of seventh reflector 10g, the angle of the second reflector 10b reflected across the z-axis may be approximately the same and opposite as the angle of sixth reflector 10f, and the angle of the third reflector 10c reflected across the z-axis may be approximately the same and opposite as the angle of fifth reflector 10e. A center reflector (e.g., fourth reflector 10d) may be approximately parallel with the y-axis. Thus, the position 300 may be used when sun rays are approximately parallel with the z-axis, or in an xz-plane. However, angles of the reflectors 10 (e.g., with the y-axis) change throughout the day as the gears 20 are rotated by the rack 30 (or other rotating mechanism) according to sunlight angle changes due to movement of the sun in the sky. As used herein, a sunlight angle may be an angle at which solar rays from the sun are incident upon the reflectors 10. The sunlight angle may change in two non-parallel directions, including throughout a day in an east-west direction and throughout a year in a north-south direction, as described further in regards to FIGS. 4A and 4B below.

The reflectors 10 are shown in FIG. 2 as being flat and rectangular shaped. However, the reflectors 10 may not be flat in some examples. For example, the reflectors 10 may include one or more bends such that the reflector 10 is not entirely in a single plane. In this way, the reflectors 10 may account for two non-parallel directions of sun movement (e.g., east-west daily movement and north-south seasonal changes), rather than just one direction (e.g., east-west daily movement). Further, in some examples, the reflectors 10 may be curved about the second axes 302 rather than bent, or a combination of curved and bent.

Figure 4A:
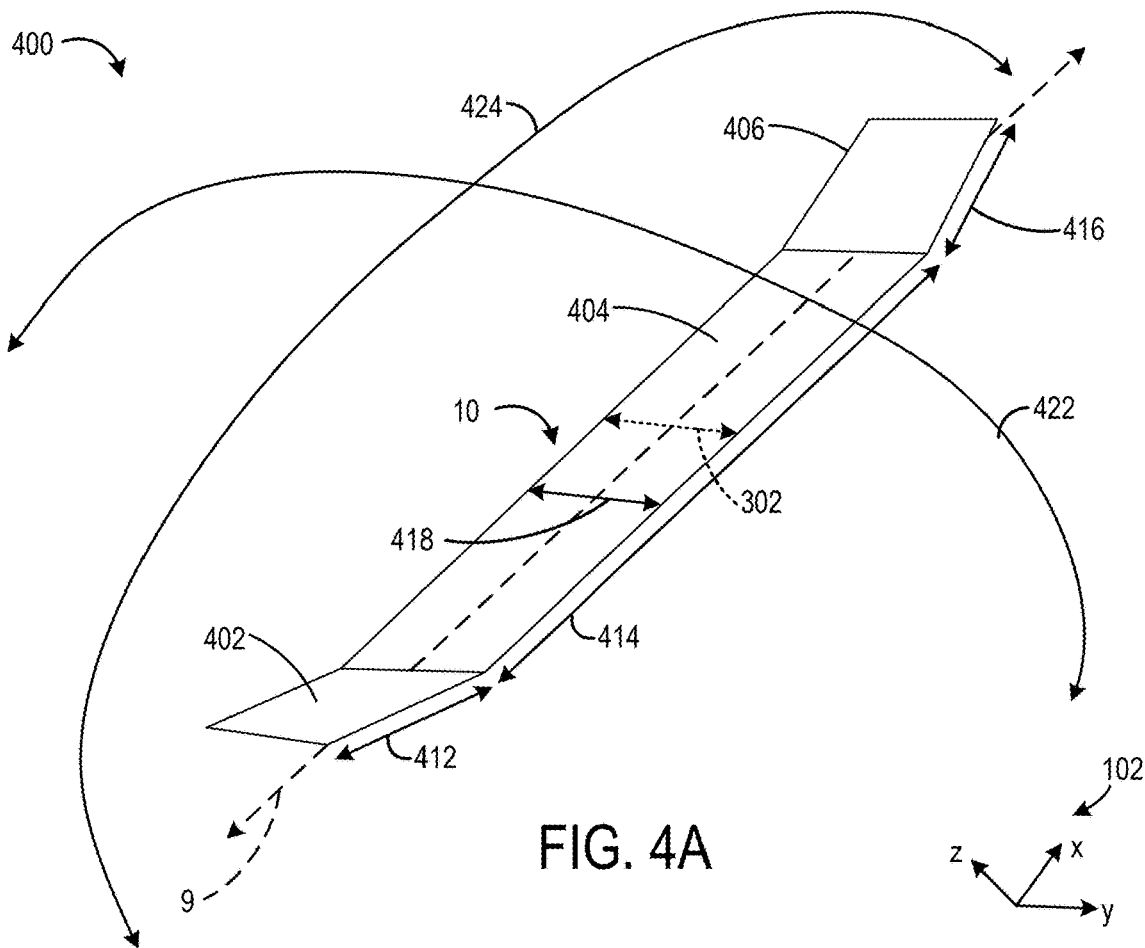
FIGS. 4A and 4B show an isometric view and a side view, respectively, of a reflector.
Figure 4B:
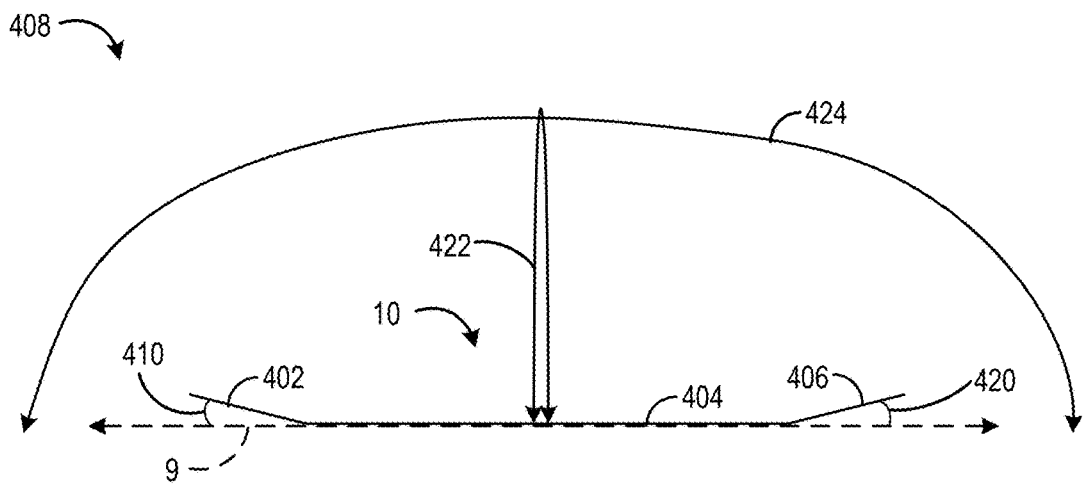

Turning to FIGS. 4A and 4B, an example of one of the reflectors 10 is shown in a perspective view 400 and a side view 408, respectively. For example, the reflector 10 may include a first portion 402, a second portion 404, and a third portion 406, wherein the first portion 402 and the third portion 406 are bent relative to the second portion 404 such that the first portion 402, the second portion 404, and the third portion 406 are not coplanar with one another. The first portion 402, the second portion 404, and the third portion 406 may be rectangular or trapezoidal in shape with a first length 412, a second length 414, and a third length 416, respectively. The first portion 402, the second portion 404, and the third portion 406 may take other shapes in other examples. The second length 414 may be longer than the first length 412 and the third length 416, in at least some examples. Additionally, or alternatively, the first length 412 and the third length 416 may be approximately the same. The first portion 402, the second portion 404, and the third portion 406 may have a common width 418 that is parallel with the y-axis. However, in other examples, the first portion 402, the second portion 404, and the third portion 406 may have different relative dimensions than shown in FIGS. 4A and 4B.

The first axis 9 about which the reflector 10 rotates may be coplanar with the second portion 404. The first portion 402 may be bent towards the positive z-direction at a first angle 410 relative to the first axis 9 and the third portion 406 may be bent towards the positive z-direction at a second angle 420 relative to the first axis 9. The first angle 410 and the second angle 420 may be approximately the same in some examples. However, the first angle 410 may be greater than or less than the second angle 420 in other examples.

Light reflection angles may be adjusted in both the y-z plane by rotating the reflector about the first axis 9, and in the x-z plane by including surfaces at non-zero angles with the first axis 9 (e.g., the first portion 402 and the third portion 406) adapted to reflect light towards an axial center of the receiver (e.g., receiver 3 of FIG. 1). In other words, sunlight angle changes may be accounted for in a direction parallel with the first axis 9 and another direction perpendicular to the first axis 9. Further, the reflector 10 may account for sunlight angle changes due to daily and seasonal movement of the sun in the sky. For example, the sun may travel in a first direction 424 and a second direction 422 relative to the reflector 10, wherein the first direction 424 is a north-south direction and the second direction 422 is an east-west direction. The reflector 10 may be rotated (e.g., by the driver 36 of FIG. 2) to account for sunlight angle changes along the second direction 422 (e.g., on a daily basis). Additionally, the reflector 10 may passively account for sunlight angle changes along the first direction due to the non-planar shape of the reflector 10 being able to reflect sunlight onto a receiver (e.g., the receiver 3 of FIG. 1) regardless of the sunlight angle changing in the first direction 424 (e.g., throughout the year). Thus, manual intervention may not be demanded in order to increase solar energy reflected by the reflectors 10 onto the receiver as sunlight angles change in two-non-parallel directions (e.g., the first direction 424 and the second direction 422).

As described above, a solar concentrator unit such as the solar concentrator unit 100 may be connected to other solar concentrator units. Modularity of the solar concentrator units may allow for customization according to geometry of an available space.

For example, turning to FIG. 5, two or more interconnected solar concentrator units, such as the solar concentrator unit 100 of FIG. 1, may be connected by joining two or more racks 30 with drive couplings 50 therebetween to form a single drive line 500. For example, each rack 30 may include a first end 31 and a second end 32 opposite the first end 31. The drive coupling 50 may include a first fitting 53 and a second fitting 52, wherein the first fitting 53 is adapted to fit with the first end 31 and the second fitting 52 is adapted to fit with the second end 32.

For example, the first end 31 may be a spherical end piece and the first fitting 53 may be a flexible snap fitting. The second end 32 may be a threaded female opening and the second fitting may be a male threaded end. In this way, the racks 30 may be removably coupled such that the solar concentrator units (e.g., solar concentrator unit 100 of FIG. 1) may be modularly configured and adjusted according to a desired spatial configuration (e.g., roof shape). Further, the solar concentrator system may be temporarily installed and relocated as demanded. To connect adjacent solar concentrator units (e.g., the solar concentrator unit 100 of FIG. 1), the first fitting 53 may be inserted through a coupling port of a first unit (e.g., the coupling port 51 of FIG. 1) and coupled with the first end 31 (e.g., by snap fit), and the second fitting 52 may be inserted through a coupling port of an adjacent second unit and coupled with the second end 32. In this way, the racks 30 may be linearly connected such that the racks are moved with the same speed due to rotation of a drive gear such as the drive gear 35 of FIGS. 2 and 3. Further, two or more interconnected solar concentrator units with connected racks 30 may share a single driver (e.g., driver 36 of FIG. 2), thereby reducing complexity and resource demand.

Additionally, as described above, receivers (e.g., receiver 3 of FIG. 1) of adjacent solar concentrator units may be connected via a connector (e.g., receiver coupling 55 of FIG. 1). In this way, fewer (e.g., one or more) fluid pumps may be used for a solar concentrator system comprising two or more solar connector units with connected receivers, thereby reducing complexity and resource demand.

An example of a solar concentrator system 700 comprising a plurality of solar concentrator units 100 is shown schematically in FIG. 7A. The solar concentrator units 100 are modular as described above and may be configured in many ways. Thus, the solar concentrator system 700 shown in FIG. 7A is one example of how the solar concentrator units 100 may be interconnected, and does not limit other configurations of the solar concentrator units 100. The schematic depiction of the solar concentrator system 700 includes gaps between the solar concentrator units 100 and drive couplings 50 outside of the solar concentrator units 100, however, in practice, the drive couplings 50 may extend into the solar concentrator units 100 (e.g., into the container 1 of FIG. 1 via the ports 51) such that smaller (e.g., negligible) gaps are interposed between horizontally adjacent solar concentrator units 100. Likewise, the gaps between vertically adjacent solar concentrator units 100 may be smaller than shown (e.g., negligible), such that in some examples, the solar concentrator units 100 are in face-sharing contact with each other.

The solar concentrator units 100 may be arranged in rows and columns with any number of solar concentrator units in the rows and columns. For example, the solar concentrator system 700 includes a first row 712, a second row 714, a third row 716, a first column 718, a second column 720, a third column 722, a fourth column 724, and a fifth column 726. Each row may include one or more solar concentrator units 100 and each column may include one or more units 100. In some examples, the rows and columns may not include equal numbers of the solar concentrator units 100. For example, the first row 712 may include more solar concentrator units 100 than the second row 714 and the second row 714 may include more solar concentrator units 100 than the third row 716. The fifth column 726 and the fourth column 724 may include more solar concentrator units 100 than the first column 718, the second column 720, the third column 722. In other examples, the rows and columns may include different numbers of solar concentrator units 100 than shown in FIG. 7A.

Adjacent units within a column (e.g., the column 718, the column 720, the column 722, the column 724, or the column 726), and more specifically the receivers of the adjacent units, may be joined by receiver couplings 55 as described above. Receivers in a column may form a receiver line 730. In examples where the receivers comprise fluid flowing through a metal pipe circumferentially surrounded by a transparent, evacuated tube, the receiver couplings 55 may fluidically couple the receivers of the solar concentrator units 100 in the corresponding receiver lines 730. Additionally, in examples wherein the receiver comprises fluid flowing through a metal pipe circumferentially surrounded by a transparent, evacuated tube, the fluid may flow through one or more solar concentrator units 100. In examples where the receivers comprise photovoltaic cells, the receiver couplings 55 may electrically couple the receivers within each receiver line 730. Further, a connecting line 706 may couple the receiver lines 730. For examples where the receivers comprise fluid, the connecting line 706 may be a pipe fluidically coupling the receivers. In this way, one fluid mover 702 (e.g., pump) may deliver flow of fluid through the solar concentrator system 700 in such an example, rather than including one mover 702 for each unit 100. For examples where the receivers comprise photovoltaic cells, the connecting line 706 may electrically couple the receiver lines 730 and the fluid mover 702 may not be included.

Further, adjacent solar concentrator units 100 within a row (e.g., the row 712, the row 714, or the row 716) may be joined into drive lines 500. For example, rotational coupling mechanisms such as the rack 30 of FIGS. 2, 3, and 5 may be mechanically coupled by the drive coupling 50 as described above with regards to FIG. 5 to form a single drive line 500. The racks (or other rotational coupling mechanism) in the drive lines 500 may be collinear and the receivers in the receiver lines 730 may be collinear, wherein the drive lines 500 are perpendicular to the receiver lines 730. In this way, a single drive gear 35 may rotationally couple to a single driver (e.g., driver 36 of FIG. 2). For example, a first drive gear of a first drive line may be rotationally coupled to a second drive line such that the first drive gear and the second drive line share a single driver. There may be one or more drivers driving rotation of gears of the solar concentrator system 700 (e.g., gears 20 and drive gear 35 of FIGS. 2, 3) and consequently, rotation of the reflectors (e.g., reflectors 10 of FIGS. 2, 3, 4A and 4B). The one or more drivers may be controlled by a controller, such as the controller 37 of FIG. 2. The controller may be positioned within one of the solar concentrator units 100, or external to the units. Connections between drive gears 35 may include any coupling extending through ports in the containers (e.g., container 1 of FIG. 1) of the solar concentrator units 100 and rotationally coupling the drive gears 35. For example, a shaft extending through ports (e.g., port 51 of FIG. 1) in the containers (e.g., container 1 of FIG. 1) may rotationally couple the drive gears 35.

The solar concentrator units 100 may be installed on a surface such that the first axes of the receivers (e.g., first axes 9 of the reflectors 10 of FIGS. 2, 4A and 4B) are parallel with a north-south line 710. The north-south line 710 may be parallel with the x-axis. The north-south line 710 may be a line of longitude. The north-south line 710 may be parallel with the first direction 424 of FIGS. 4A and 4B. In this way, the receivers may collect a greater amount of sunlight throughout the day than by positioning the solar concentrator units 100 in other orientations where the receiver lines 730 are at a non-zero angle with the north-south line 710.

The receiver lines 730 may be further coupled (e.g., electrically or fluidically for photovoltaic and fluid receivers, respectively) to other components. For examples where the receivers include fluid, the receiver lines 730 may be fluidically coupled to a converter adapted to convert the thermal energy absorbed by the fluid into electrical energy to be used (e.g., to operate an electrically powered device) or stored (e.g., in a battery). For examples where the receivers comprise photovoltaic cells, the receiver lines 730 may be electrically coupled to an energy storage component (e.g., battery) for storage of collected electrical energy and/or an energy providing system (e.g., power grid) for direct use of the collected electrical energy.

Another example of a solar concentrator system 750 comprising a plurality of interconnected solar concentrator units 100 is shown in FIG. 7B. The solar concentrator system 750 is an example of a solar concentrator system where modularity of the solar concentrator units 100 may allow for installation according to the geometry of a space 752. The space 752 may be any shape with any proportions, and arrangement of the solar concentrator units 100 may be adjusted accordingly. For example, the solar concentrator units 100 may be arranged to accommodate non-rectangular shapes, having cutouts 754, extensions 756, curved portions, angled (e.g., triangular) portions, and the like.

The solar concentrator system 750 is also an example of a solar concentrator system wherein more than one driver may be included, such as the driver 36 of FIG. 2. For example, a first driver may rotate a first drive gear 35a and a second driver may rotate a second drive gear 35b. Additional drivers may be included. For example, each drive gear 35 may be coupled to its own driver. More drivers may also be included as backups for when maintenance is demanded on one of the one or more drivers.

The solar concentrator system 750 is also an example of a solar concentrator system wherein more than one fluid mover 702 may be included, for examples where the receivers comprise fluid. For example, more than one fluid mover 702 may be included in a single solar concentrator system to increase flow rate beyond capacity of a single pump. Similar to the drivers, additional fluid movers may be installed as backups for when maintenance is demanded on the fluid mover 702. However, the solar concentrator system 750 may also be configured with a single fluid mover 702 by fluidically coupling the two connecting lines 706. In examples wherein the receivers comprise photovoltaic cells, the connecting lines 706 may be electrically coupled.

Further, two solar concentrator units may be coupled such that the two solar concentrator units share a single receiver, rather than two receivers. In this way, a solar concentrator system may comprise fewer receivers (e.g., receiver 3 of FIG. 1) than containers (e.g., container 1 of FIG. 1). For example, tuning to FIG. 8, a solar concentrator system 800 comprising two solar concentrator units 100, including a first solar concentrator unit 100a and a second solar concentrator unit 100b, sharing a single receiver 3 is shown. The receiver 3 is shown in FIG. 8 configured as a joint receiver. A single shared receiver receiving light reflected by reflectors contained in two or more separate weather-resistant containers may be referred to herein as a joint receiver. The joint receiver 3 may be physically coupled to both a first container 1a and a second container 1b via the supports 4. The curved reflector 41 may be partially circumferentially surrounding the joint receiver 3.

The first container 1a and the second container 1b may be weather-resistant containers, each with a transparent top 2. Thus, the first container 1a and the second container 1b may also be respectively referred to herein as the first weather-resistant container and the second weather-resistant container. The first container 1a and the second container 1b may be positioned adjacent to one another. For example, the first container 1a and the second container 1b of the first solar concentrator unit 100a and the second solar concentrator unit 100b, respectively, may be aligned with lengths 108 parallel, widths 106 coaxial, and tops 2 coplanar. A coupler such as the drive coupling 50 of FIG. 5 may be inserted into port 51a to rotationally couple reflectors (e.g., reflectors 10 of FIGS. 4A and 4B) enclosed in the first container 1a and the second container 1b. In some examples, the first container 1a and the second container 1b may be in face-sharing contact. In other examples, the first container 1a and the second container 1b may be spaced apart with a gap therebetween.

The first container 1a and the second container 1b may enclose a first plurality of reflectors and a second plurality of reflectors extending along first axes (e.g., first axes 9 of FIG. 2) that are parallel and axes of rotation. The first plurality of reflectors and the second plurality of reflectors may be shaped with three non-coplanar flat surfaces in at least some examples as described with regards to FIGS. 4A and 4B. However, in other examples, the first plurality of reflectors and the second plurality of reflectors may be shaped as a curved surface. In yet other examples, the reflectors may comprise a combination of flat and curved surfaces. The first plurality of reflectors and the second plurality of reflectors may be rotationally coupled. For example, the first plurality of reflectors and the second plurality of reflectors may be rotationally coupled via linearly coupling racks with a drive coupling as described in regards to FIG. 3. However, other means of rotationally coupling the first plurality of reflectors and the second plurality of reflectors are possible within the scope of the present disclosure. Further, the first plurality of reflectors and the second plurality of reflectors may be angled to reflect light onto the joint receiver 3. As such, reflector angles (e.g., angles of second axes perpendicular with the first axes such as second axes 302 of FIG. 3) may be different than in examples where a receiver is centered above a single receiver such as shown in FIG. 1. The appropriate reflector angles may thus depend on a configuration of a solar concentrator system, including the distance 110 and lateral positioning of the receiver 3 relative to the containers 1 along the y-axis. The receiver may be positioned over a gap (or face-sharing contact interface) between the containers 1 in at least some examples. However, in other examples, the joint receiver 3 may not be centered with respect to the first container 1a and the second container 1b. For example, the joint receiver 3 may be positioned above the first container 1a and reflectors contained in both the first container 1a and the second container 1b may reflect onto the joint receiver 3. In another example, the joint receiver 3 may be positioned above the second container 1b and reflectors contained in both the first container 1a and the second container 1b may reflect onto the joint receiver 3.

The solar concentrator system 800 may be interconnected with other solar concentrator units via drive couplings such as the drive coupling 50 of FIGS. 5, 7A, and 7B extending through one or more ports such port 51b and/or via receiver couplings such as the receiver coupling 55. For example, the solar concentrator system 800 may be interconnected with one or more other solar concentrator systems comprising a joint receiver. Additionally, or alternatively, the solar concentrator system 800 may be interconnected with one or more solar concentrator units having individual receivers (e.g., the same number of receivers as containers).

In this way, more sun rays 120 may be reflected onto the receiver 3 without increasing a size of the containers 1. Further, reducing a number of receivers 3 reduces resource demand while increasing energy captured compared to a single solar concentrator unit with a container of the same size and a single receiver, such as the example shown in FIG. 1. Further still, such a configuration may further contribute to modularity in solar concentrator systems according to geometry of an available space, thus reducing complexity of customization and increasing space efficiency. For example, the receiver 3 may be coupled with other receivers such that the containers are not aligned in a column as described with reference to FIGS. 7A and 7B, but rather offset or staggered. In this way, a greater number of spatial configurations may be possible than by including one receiver per container such as shown in FIGS. 1, 7A and 7B.

Turning to FIG. 6, a flowchart of a method 600 is shown for operating a solar concentrator system. For example, the solar concentrator system may comprise an individual solar concentrator unit (e.g., solar concentrator unit 100 of FIG. 1), or a plurality of interconnected solar concentrator units (e.g., the solar concentrator system 700, 750, or 800 of FIGS. 7A, 7B, and 8, respectively). As described above, the solar concentrator system may be installed in a way such that sunlight (e.g., sun rays 120 of FIG. 1) absorbed by a receiver thereof (e.g., receiver 3 of FIGS. 1 and 8, or receiver lines 730 of FIGS. 7A and 7B) is maximized. For example, first axes of reflectors (e.g., the first axes 9 of the reflectors 10 of FIGS. 2 and 4A-4B) may be oriented in a north-south direction. Further, the solar concentrator system may be inclined at an angle where sunlight is perpendicular to the first axes a mid-day on an equinox. The method 600 may be implemented on a daily basis by the solar concentrator system following installation. For example, the method 600 may be stored as instructions in memory (e.g., non-volatile memory) of a controller (e.g., the controller 37 of FIG. 2) adapted to execute the method 600.

The method 600 begins at 602 wherein the controller receives notification of sunrise. For example, photodetector sensors communicatively coupled to the controller may detect light exposure greater than a threshold corresponding to sunrise, and accordingly send a signal notifying the controller of the sunrise. Additionally, or alternatively, a timer (e.g., real-time clock) of the controller may reach a pre-determined time at which sunrise occurs. The pre-determined sunrise time may be stored in memory of the controller. Further, due to an actual sunrise time changing over the course of a year, the pre-determined sunrise time may be dependent on the calendar day. As such, a plurality of pre-determined sunrise times may be stored in memory of the controller, with the controller adapted to detect sunrise in response to the timer of the controller reaching the time corresponding to the day or range of days. For example, the pre-determined time at which sunrise occurs may be the same for a range of days (e.g., each week, month, or other time range) to reduce memory capacity demands while accounting for actual sunrise time changes throughout the year. Further, the pre-determined times may be programmed into the controller according to a geographical location of installation for the solar concentrator units. For example, sunrise times may vary depending on elevation (e.g., sea level vs in mountainous area), time zone, latitude, and/or longitude.

The method proceeds to 604 wherein rotation of reflectors in a first angular direction from a starting position is initiated in response to receiving the notification of the sunrise. The starting position may be a set of angular positions of the reflectors where the reflectors reflect incident sunlight towards the reflector when the sun is low in elevation relative to the horizon. The first angular direction may be the same direction as the sun travels in the sky from sunrise to sunset.

As described above, rotation of the reflectors may be driven by a driver such as a motor (e.g., the driver 36 of FIG. 2) communicatively coupled to and controlled by the controller. As such, 604 may include 614, wherein the driver is powered by energy stored in the solar concentrator system (e.g., a battery of the solar concentrator system). For example, the energy may have been stored at 612 of the method 600 on a previous day. Thus, the rotation of receivers may be driven by energy captured by the solar concentrator system, thereby making the solar concentrator system independent of other sources of energy outside of the solar concentrator system.

The method 600 proceeds to 606, wherein the rotation of the reflectors towards an ending position is regulated to account for sunlight angle changes (e.g., due to movement of the sun in the sky) in two non-parallel directions. The two non-parallel directions may include a north-south direction and an east-west direction, such as the first direction 424 and the second direction 422 of FIGS. 4A and 4B. Regulating rotation may include actively and passively tracking sunlight angle changes.

606 includes 616, wherein the reflectors are actively rotated with an angular speed to track sunlight angle changes along the east-west direction. Specifically, the reflectors are rotated about the first axes, all at the same angular speed. The angular speed may be approximately half of a speed at which the sun moves through the sky (e.g., relative to the solar concentrator system). The angular speed may change throughout the year depending on a length of time between sunrise and sunset, according to instructions stored in memory of the controller. Additionally, as described above, the first angular direction may be the same angular direction at which the sun moves in the sky from sunrise to sunset (e.g., along the second direction 422 of FIGS. 4A and 4B). In this way, sunlight incident upon the reflectors may be reflected onto the receiver throughout the day.

606 further includes 618, wherein sunlight angle changes in the north-south direction are passively accounted for. For example, the reflectors may be shaped as described with reference to FIGS. 4A and 4B, with three non-coplanar flat surfaces (or a curved surface) adapted to reflect light onto the receiver regardless of a position of the sun in the north-south direction. Ends of the reflectors may reflect slightly inwards rather than directly parallel with a middle of the reflectors. In this way, seasonal movement of the sun may be passively accounted for by the solar concentrator system.

The method proceeds to 608, wherein energy collected by the receiver is used or stored. As sunlight is reflected on to the receiver due to the regulation of the rotation of the reflectors at 606, the receiver absorbs energy from the sunlight, which may be converted to electrical energy by the solar concentrator system. The electrical energy may be used, for example to power electrically operated devices, or stores, for example in a battery for later usage. For example, the stored energy may be used at night, when energy is not being captured by the solar concentrator unit due to absence of sun exposure.

The method proceeds to 610, wherein notification of sunset is received. Similar to the notification of sunrise at 602, the notification of sunset may originate from the sensors and/or the timer. For example, photodetectors may detect light below a threshold intensity at which is considered sunset. Additionally, or alternatively, the timer may reach a pre-determined time of sunset. Like the pre-determined sunrise times, the pre-determined sunset times may change throughout the year, and thus be dependent on calendar date and geographical location. Accordingly, a plurality of pre-determined sunset times according to times of year may be programmed in memory of the controller.

The method proceeds to 612, wherein the reflectors are rotated in a second angular direction to return the reflectors to the starting position in response to receiving notification of the sunset. The second angular direction may be opposite the first angular direction. For example, if from a given point of view down the first axes the first angular direction is clockwise, the second angular direction may be counter-clockwise from the same point of view. In this way, the solar concentrator system may be prepared for sunrise in the next iteration of the method 600 on the following day.

612 includes 620, wherein the driver is powered with the energy collected by the receiver. Like 614, the driver may be powered with energy in the solar concentrator system. Thus, the solar concentrator system may be independent of other energy sources outside of the solar concentrator system.

The method 600 ends after resetting to the starting position at 612. Thus, the solar concentrator system may repeat the method 600 the next day, beginning at sunrise. By operating the solar concentrator system with the method 600, sunlight captured by the solar concentrator unit may be maximized due to tracking the movement of the sun in two non-parallel directions to account for both daily and seasonal changes in sun location. Further, the solar concentrator unit may be self-sufficient in terms of energy such that other energy sources are not demanded to operate the solar concentrator unit. Further still, the solar concentrator unit may be used to power devices and store energy for later usage, with increased energy produced from the solar concentrator unit following the method 600 versus other solar collectors capable of tracking the movement of the sun in only one direction.

The technical effect of the solar concentrator systems disclosed herein and methods of operating the solar concentrator systems is to reduce maintenance demands and complexity of installation of solar concentrators and provide a modular system that is more easily customizable to a variety of available spaces, including small spaces, such as rooftops. Further, as a concentrating solar collector, the solar concentrator systems disclosed herein may allow for increased energy capture compared to non-concentrating solar collectors currently used in such small spaces. Further still, the solar concentrator systems may collect more energy by accounting for sunlight angle changes in two non-parallel directions than other solar concentrators which track movement of the sun in a single direction. Moreover, the modularity of the solar concentrator systems may allow for power generation near where the power is demanded such as residences and businesses, thereby reducing (e.g., eliminating) demand for power lines, pipelines, or other energy delivery infrastructure that may be demanded by other renewable energy installations.

The disclosure also provides support for a solar concentrator unit, comprising: a weather-resistant container with a transparent top, a receiver, and a plurality of reflectors positioned within the weather-resistant container and adapted to reflect light onto the receiver. In a first example of the system, the receiver comprises fluid in a metal pipe circumferentially surrounded by a transparent, evacuated tube. In a second example of the system, optionally including the first example, the system further comprises: a curved reflector partially circumferentially surrounding the receiver and adapted to reflect light onto the receiver. In a third example of the system, optionally including one or both of the first and second examples, the receiver comprises photovoltaic cells. In a fourth example of the system, optionally including one or more or each of the first through third examples, the plurality of reflectors extends along first axes, and wherein the first axes are parallel axes of rotation about which the plurality of reflectors rotates at approximately the same angular speed. In a fifth example of the system, optionally including one or more or each of the first through fourth examples, each of the plurality of reflectors comprises three non-coplanar flat surfaces angled to account for changes in angles of sunlight perpendicular to rotation of the plurality of reflectors about the first axes. In a sixth example of the system, optionally including one or more or each of the first through fifth examples, second axes of the plurality of reflectors perpendicular with the first axes are not collinear or parallel such that each of the plurality of reflectors is angled towards the receiver. In a seventh example of the system, optionally including one or more or each of the first through sixth examples, the weather-resistant container includes one or more ports through which drive couplings extend to connect the solar concentrator unit to one or more other solar concentrator units. In an eighth example of the system, optionally including one or more or each of the first through seventh examples, the receiver is configured as a joint receiver shared by the weather-resistant container and a second weather-resistant container positioned adjacent to the weather-resistant container such that the plurality of reflectors and a second plurality of reflectors positioned within the second weather-resistant container reflect light onto the joint receiver.

The disclosure also provides support for a solar concentrator system, comprising: two or more interconnected solar concentrator units, each solar concentrator unit comprising: a weather-resistant container with a transparent top, a receiver positioned outside of the weather-resistant container, and a plurality of reflectors positioned within the weather-resistant container, the plurality of reflectors rotationally coupled to a rack positioned within the weather-resistant container and driven by a driver rotationally coupled to a drive gear in mesh with the rack, wherein racks of adjacent solar concentrator units are coupled via a drive coupling extending through ports in the weather-resistant container to form drive lines, and wherein receivers of adjacent solar concentrator units are coupled via receiver couplings between the receivers to form receiver lines. In a first example of the system, the system further comprises: a first drive gear of a first drive line rotationally coupled to a second drive line such that the first drive line and the second drive line share a single driver. In a second example of the system, optionally including the first example, two of the two or more interconnected solar concentrator units share a joint receiver. In a third example of the system, optionally including one or both of the first and second examples, the receiver comprises fluid in a metal pipe circumferentially surrounded by a transparent, evacuated tube and the receiver couplings fluidically couple the receiver lines such that a single fluid mover pumps fluid through the receiver lines. In a fourth example of the system, optionally including one or more or each of the first through third examples, ends of each of the plurality of reflectors are bent or curved at a non-zero angle with axes of rotation of the plurality of reflectors. In a fifth example of the system, optionally including one or more or each of the first through fourth examples, the driver is adapted to track sunlight angle changes and angle the plurality of reflectors such that the sunlight is reflected by the plurality of reflectors towards the receiver. In a sixth example of the system, optionally including one or more or each of the first through fifth examples, each of the two or more interconnected solar concentrator units further comprises a curved reflector positioned over the receiver and partially surrounding the receiver such that the receiver is positioned between the plurality of reflectors and the curved reflector. In a seventh example of the system, optionally including one or more or each of the first through sixth examples, the transparent top is sealed with sides of the weather-resistant container such that the weather-resistant container is waterproof. In an eighth example of the system, optionally including one or more or each of the first through seventh examples, the plurality of reflectors is positioned with non-zero angles between second axes perpendicular to axes of rotation of the plurality of reflectors.

The disclosure also provides support for a method for operating a solar concentrator system, comprising: receiving notification of sunrise, in response to receiving the notification of sunrise, initiating rotation of reflectors of the solar concentrator system in a first angular direction from a starting position, regulating the rotation of the reflectors towards an ending position to reflect sunlight onto a receiver and account for sunlight angle changes in two non-parallel directions, storing or using energy collected by the receiver, receiving notification of sunset, in response to receiving the notification of sunset, rotating the reflectors in a second angular direction to return the reflectors to the starting position. In a first example of the method, regulating the rotation of the reflectors comprises actively rotating the reflectors with an angular speed to track sunlight angle changes along an east-west direction and passively accounting for sunlight angle changes in a north-south direction.

FIGS. 1-5 and 7A-8 show example configuration with relative positioning of the various components. FIGS. 1-5 and 8 are shown with approximate relative sizing and positioning, though other relative sizing and positioning may be used. As used herein, the terms "approximately" is construed to mean plus or minus five percent of the range unless otherwise specified.

If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis referenced unless otherwise specified. Features described as counter-axial may be approximately perpendicular to the axis referenced unless otherwise specified. Features described as radial may circumferentially surround or extend outward from an axis, such as the axis referenced, or a component or feature described prior as being radial to a referenced axis, unless otherwise specified.

Features described as longitudinal may be approximately parallel with an axis that is longitudinal. A lateral axis may be normal to a longitudinal axis and a vertical axis. Features described as lateral may be approximately parallel with the lateral axis. A vertical axis may be normal to a lateral axis and a longitudinal axis. Features described as vertical may be approximately parallel with a vertical axis.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A solar concentrator unit, comprising:
   a weather-resistant container with a transparent top, wherein the weather resistant container is rectangular prism shaped and has a height significantly smaller than a length and a width;
   a receiver positioned above the weather-resistant container; and
   a plurality of reflectors positioned within the weather-resistant container and adapted to reflect light onto the receiver, wherein the plurality of reflectors extends along first axes, wherein the first axes are parallel axes of rotation about which the plurality of reflectors rotates at approximately the same angular speed, and wherein each of the plurality of reflectors comprises three non-coplanar flat surfaces angled to account for changes in angles of sunlight perpendicular to rotation of the plurality of reflectors about the first axes.

2. The solar concentrator unit of claim 1, wherein the receiver comprises fluid in a metal pipe circumferentially surrounded by a transparent, evacuated tube.

3. The solar concentrator unit of claim 1, further comprising a curved reflector partially circumferentially surrounding the receiver and adapted to reflect light onto the receiver.

4. The solar concentrator unit of claim 1, wherein the receiver comprises photovoltaic cells.

5. The solar concentrator unit of claim 1, wherein second axes of the plurality of reflectors perpendicular with the first axes are not collinear or parallel such that each of the plurality of reflectors is angled towards the receiver.

6. The solar concentrator unit of claim 1, wherein the weather-resistant container includes one or more ports through which drive couplings extend to connect the solar concentrator unit to one or more other solar concentrator units.

7. The solar concentrator unit of claim 1, wherein the receiver is configured as a joint receiver shared by the weather-resistant container and a second weather-resistant container positioned adjacent to the weather-resistant container such that the plurality of reflectors and a second plurality of reflectors positioned within the second weather-resistant container reflect light onto the joint receiver.

8. A solar concentrator system, comprising:
   two or more interconnected solar concentrator units, each solar concentrator unit comprising:
      a weather-resistant container with a transparent top;

a receiver positioned outside of the weather-resistant container; and a plurality of reflectors positioned within the weather-resistant container, the plurality of reflectors rotationally coupled to a rack positioned within the weather-resistant container and driven by a driver rotationally coupled to a drive gear in mesh with the rack, wherein racks of adjacent solar concentrator units are coupled via a drive coupling extending through ports in the weather-resistant container to form drive lines, and wherein receivers of adjacent solar concentrator units are coupled via receiver couplings between the receivers to form receiver lines.

9. The solar concentrator system of claim 8, further comprising a first drive gear of a first drive line rotationally coupled to a second drive line such that the first drive line and the second drive line share a single driver.

10. The solar concentrator system of claim 8, wherein two of the two or more interconnected solar concentrator units share a joint receiver.

11. The solar concentrator system of claim 8, wherein the receiver comprises fluid in a metal pipe circumferentially surrounded by a transparent, evacuated tube and the receiver couplings fluidically couple the receiver lines such that a single fluid mover pumps fluid through the receiver lines.

12. The solar concentrator system of claim 8, wherein ends of each of the plurality of reflectors are bent or curved at a non-zero angle with axes of rotation of the plurality of reflectors.

13. The solar concentrator system of claim 8, wherein the driver is adapted to track sunlight angle changes and angle the plurality of reflectors such that the sunlight is reflected by the plurality of reflectors towards the receiver.

14. The solar concentrator system of claim 8, wherein each of the two or more interconnected solar concentrator units further comprises a curved reflector positioned over the receiver and partially surrounding the receiver such that the receiver is positioned between the plurality of reflectors and the curved reflector.

15. The solar concentrator system of claim 8, wherein the transparent top is sealed with sides of the weather-resistant container such that the weather-resistant container is waterproof.

16. The solar concentrator system of claim 8, wherein the plurality of reflectors is positioned with non-zero angles between second axes perpendicular to axes of rotation of the plurality of reflectors.

17. A method for operating a solar concentrator system, comprising:

receiving notification of sunrise;

in response to receiving the notification of sunrise, initiating rotation of reflectors of the solar concentrator system about axes of rotation in a first angular direction from a starting position, wherein ends of the reflectors are bent or curved about second axes perpendicular to the axes of rotation;

regulating the rotation of the reflectors towards an ending position to reflect sunlight onto a receiver and account for sunlight angle changes in two non-parallel directions;

storing or using energy collected by the receiver;

receiving notification of sunset; and in response to receiving the notification of sunset, rotating the reflectors in a second angular direction to return the reflectors to the starting position.

18. The method of claim 17, wherein regulating the rotation of the reflectors comprises actively rotating the reflectors with an angular speed to track sunlight angle changes along an east-west direction and passively accounting for sunlight angle changes in a north-south direction.

* * * * *